US009882835B2

(12) United States Patent
Xu et al.

(10) Patent No.: US 9,882,835 B2
(45) Date of Patent: Jan. 30, 2018

(54) PROGRAMMING METHOD AND APPARATUS FOR CORE ROUTING AND SWITCHING SYSTEM

(71) Applicant: Tsinghua University, Beijing (CN)

(72) Inventors: Ke Xu, Beijing (CN); Yuchao Zhang, Beijing (CN); Meng Shen, Beijing (CN); Youjian Zhao, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 162 days.

(21) Appl. No.: 14/887,283

(22) Filed: Oct. 19, 2015

(65) Prior Publication Data
US 2016/0112331 A1    Apr. 21, 2016

(30) Foreign Application Priority Data
Oct. 21, 2014  (CN) .......................... 2014 1 0564651

(51) Int. Cl.
H04B 7/204 (2006.01)
H04L 12/911 (2013.01)
H04L 12/24 (2006.01)

(52) U.S. Cl.
CPC ........ H04L 47/822 (2013.01); H04L 41/0823 (2013.01); H04L 41/0896 (2013.01); H04L 41/5051 (2013.01)

(58) Field of Classification Search
CPC ............... H04L 47/822; H04L 41/0823; H04L 41/0896; H04L 41/5051
See application file for complete search history.

(56) References Cited

U.S. PATENT DOCUMENTS

2010/0115095 A1* 5/2010 Zhu ......................... H04L 67/12
709/226
2012/0182046 A1  7/2012 Teig et al.

FOREIGN PATENT DOCUMENTS

CN    102055651 A    5/2011
CN    102204187 A    9/2011

OTHER PUBLICATIONS

Zhang Xiao-Ping, et al., "Scalable Router", ISSN 1000-9825, CODEN RUXUEW, Journal of Software, vol. 19, No. 6, Jun. 2008, pp. 1452-1464.

(Continued)

Primary Examiner — Afshawn Towfighi
(74) Attorney, Agent, or Firm — Kile Park Reed & Houtteman LLC

(57) ABSTRACT

A programming method and a programming apparatus for a core routing and switching system are provided. The method includes: obtaining a number of routing nodes and a number of resource types in each routing node in the core routing and switching system; judging whether a first requirement for resources in the routing nodes is changed to a second requirement; judging whether resources in a first routing node group corresponding to the first requirement meet the second requirement if the first requirement is changed; searching for a plurality of second routing node groups with resources meeting the second requirement if the resources in the first routing node group do not meet the second requirement; calculating a plurality of migration overheads corresponding to the plurality of second routing node groups; selecting a second routing node group corresponding to a smallest migration overhead from the plurality of second routing node groups.

9 Claims, 3 Drawing Sheets

(56) References Cited

OTHER PUBLICATIONS

Li Dan, et al., "Data Center Network Research Progress and Trend", Chinese Journal of Computers, vol. 37 No. 2, Feb. 2014.
China Patent Office, Office action dated Jan. 18, 2017.

* cited by examiner

PROGRAMMING METHOD AND APPARATUS FOR CORE ROUTING AND SWITCHING SYSTEM

CROSS REFERENCE TO RELATED APPLICATION

This application claims priority to and benefits of Chinese Patent Application No. 201410564651.3, filed with State Intellectual Property Office on Oct. 21, 2014, the entire content of which is incorporated herein by reference.

FIELD

The present disclosure relates to an Internet field, and more particularly, to a programming method for a core routing and switching system and a programming apparatus for a core routing and switching system.

BACKGROUND

A routing and switching system is a hub for transferring data in the Internet. With a growth of the Internet scale, a data exchange capacity and a speed rate of an interface are improved continually. In the last decade, the Internet has shown a rapid development trend, therefore, a development of an open and extendible routing and switching system is imminent. In order to support the rapid development of the Internet, it is necessary that the performance of the routing and switching system is improved continuously and that an innovation of the Internet network service is supported by the routing and switching system. Therefore, in order to support new service, the function of the routing and switching system is required to be updated and upgraded frequently. However, in the related art, since the development of the routing and switching system is closed, and a third party cannot participate into the development, the update and upgrade of the function of the routing and switching system only relies on a vendor, such that a development cycle is long, a development cost is high, a flexibility is poor, and a development bottleneck is brought in the routing and switching system.

SUMMARY

Embodiments of the present disclosure seek to solve at least one of the problems existing in the related art to at least some extent.

Accordingly, a first objective of the present disclosure is to provide a programming method for a core routing and switching system, which may improve a response speed of the core routing and switching system, optimize a user experience and support a reconfiguration of a route when the core routing and switching system is running.

A second objective of the present disclosure is to provide a programming apparatus for a core routing and switching system.

A third objective of the present disclosure is to provide a non-transitory computer-readable storage medium.

In order to achieve above objectives, embodiments of a first aspect of the present disclosure provide a programming method for a core routing and switching system, including: obtaining a number of routing nodes and a number of resource types in each routing node in the core routing and switching system; judging whether a first requirement of a user for resources in the routing nodes in the core routing and switching system is changed to a second requirement of the user; judging whether resources in a first routing node group corresponding to the first requirement meet the second requirement if the first requirement is changed to the second requirement; searching for a plurality of second routing node groups with resources meeting the second requirement in the core routing and switching system if the resources in the first routing node group do not meet the second requirement; calculating a plurality of migration overheads corresponding to the plurality of second routing node groups; selecting a second routing node group corresponding to a smallest migration overhead from the plurality of second routing node groups as a server node for providing a service for a task corresponding to the second requirement.

With the programming method for a core routing and switching system according to embodiments of the present disclosure, when the first requirement of the user is changed to the second requirement in the core routing and switching system, if resources in the first routing node group corresponding to the first requirement cannot meet the second requirement of the user, firstly, it is judged whether other routing nodes in the core routing and switching system have enough resources meeting the second requirement, and if there are other routing nodes with resources meeting the second requirement, the plurality of second routing node groups (i.e. groups including routing nodes in which resources meet the second requirement) are determined, and then a second routing node group corresponding to a smallest migration overhead may be selected from the plurality of second routing node groups, and then the route is changed. This method may improve a response speed of the core routing and switching system, optimize a user experience and support a reconfiguration of a route when the core routing and switching system is running.

In some embodiments, obtaining a number of routing nodes and a number of resource types in each routing node in the core routing and switching system includes: maintaining by the core routing and switching system a plurality of tuples for the routing nodes in the core routing and switching system, wherein each element in a tuple represents a residual amount of a type of resource in a routing node corresponding to the tuple and the tuple is denoted as formula (1), $$T_{i \in N} = (r_{i,1}, r_{i,2}, \ldots r_{i,t}, \ldots, r_{i,M}) \quad (1)$$

where i represents a $i^{th}$ routing node, t represents a $t^{th}$ type of resource, N represents the number of the routing nodes in the core routing and switching system, M represents the number of the resource types, $r_{i,t}$ represents a residual amount of the $t^{th}$ type of resource in the $i^{th}$ routing node, $T_{i \in N}$ represents the tuple, and $1 \leq t \leq M$.

In some embodiments, judging whether resources in a first routing node group corresponding to the first requirement meet the second requirement includes: determining the first routing node group corresponding to the first requirement; defining the first requirement of a $j^{th}$ user as $D_j = (d_{j,1}, d_{j,2}, \ldots d_{j,t}, \ldots, d_{j,M})$, the second requirement of the $j^{th}$ user as $D'_j = (d'_{j,1}, d'_{j,2}, \ldots d'_{j,t}, \ldots, d'_{j,M})$ and the first routing node group as $\Gamma$, where $d_{j,t}$ represents a demand of the $j^{th}$ user for the $t^{th}$ type of resource in the first requirement, $d'_{j,t}$ represents a demand of the $j^{th}$ user for the $t^{th}$ type of resource in the second requirement; judging whether a residual amount of the $t^{th}$ type of resource in a routing node corresponding to the demand of the $j^{th}$ user for the $t^{th}$ type of resource in the first requirement is greater than the demand $d'_{j,t}$ of the $j^{th}$ user for the $t^{th}$ type of resource in the second requirement; if yes, judging that the resources in the first routing node group meet the second requirement; if no, judging that the resources in the first routing node group do not meet the second requirement.

In some embodiments, searching for a plurality of second routing node groups with resources meeting the second requirement in the core routing and switching system includes: determining routing nodes T with available resources; for each routing node with available resources, judging whether $r_{k,t} > d'_{j,t}, \forall k \in T, 1 \le t \le M$;
if yes, defining the routing node with available resources as an available routing node such that routing nodes are obtained; permitting and combining the available routing nodes to obtain the plurality of second routing node groups.

In some embodiments, if there are $n_t$ routing nodes with the $t^{th}$ type of resource meeting the demand $d'_{j,t}$ of the $j^{th}$ user for the $t^{th}$ type of resource in the second requirement, a number of the plurality of second routing node groups is $$n_1 \times n_2 \times \ldots \times n_M.$$

In some embodiments, calculating a plurality of migration overheads corresponding to the plurality of second routing node groups includes: defining routing nodes in a second routing node group as $P_i, P_{i+1}, \ldots, P_{i+k}, \ldots P_{i+M}$, where $1 \le i \le N-M$; calculating a migration overhead of the second routing node group according to formula (2), $$S = S_{in} + S_{out} + S_{ch} \tag{2},$$

where $S_{in}$ represents a sum of internal communication overheads of the routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

In order to achieve the above objectives, embodiments of a second aspect of the present disclosure provide a programming apparatus for a core routing and switching system, including: an obtaining module, configured to obtain a number of routing nodes and a number of resource types in each routing node in the core routing and switching system; a first judging module, configured to judge whether a first requirement of a user for resources in the routing nodes in the core routing and switching system is changed to a second requirement of the user; a second judging module, configured to judge whether resources in a first routing node group corresponding to the first requirement meet the second requirement if the first requirement is changed to the second requirement; a searching module, configured to search for a plurality of second routing node groups with resources meeting the second requirement in the core routing and switching system if the resources in the first routing node group do not meet the second requirement; a calculating module, configured to calculate a plurality of migration overheads corresponding to the plurality of second routing node groups; a selecting module, configured to select a second routing node group corresponding to a smallest migration overhead from the plurality of second routing node groups as a server node for providing a service for a task corresponding to the second requirement.

With the programming apparatus for a core routing and switching system according to embodiments of the present disclosure, when the first requirement of the user is changed to the second requirement in the core routing and switching system, if resources in the first routing node group corresponding to the first requirement cannot meet the second requirement of the user, firstly, it is judged whether other routing nodes in the core routing and switching system have enough resources meeting the second requirement, and if there are other routing nodes with resources meeting the second requirement, the plurality of second routing node groups (i.e. groups including routing nodes in which resources meet the second requirement) are determined, and then a second routing node group corresponding to a smallest migration overhead may be selected from the plurality of second routing node groups, and then the route is changed. This programming apparatus may improve a response speed of the core routing and switching system, optimize a user experience and support a reconfiguration of a route when the core routing and switching system is running.

In some embodiments, the obtaining module is configured to obtain a number of routing nodes and a number of resource types of each routing node in the core routing and switching system by a step of: maintaining a plurality of tuples for the routing nodes in the core routing and switching system, wherein each element in a tuple represents a residual amount of a type of resource in a routing node corresponding to the tuple and the tuple is denoted as formula (1), $$T_{i \in N} = (r_{i,1}, r_{i,2}, \ldots r_{i,t}, \ldots, r_{i,M}) \tag{1}$$

where i represents a $i^{th}$ routing node, t represents a $t^{th}$ type of resource, N represents the number of the routing nodes, M represents the number of the resource types, $r_{i,t}$ represents a residual amount of the $t^{th}$ type of resource in the $i^{th}$ routing node, $T_{i \in N}$ represents the tuple, and $1 \le t \le M$.

In some embodiments, the second judging module is configured to judge whether resources in a first routing node group corresponding to the first requirement meet the second requirement by steps of: determining the first routing node group corresponding to the first requirement; defining the first requirement of a $j^{th}$ user as $D_j = (d_{j,1}, d_{j,2}, \ldots d_{j,t}, \ldots, d_{j,M})$, the second requirement of the $j^{th}$ user as $D'_j = (d'_{j,1}, d'_{j,2}, \ldots d'_{j,t}, \ldots, d'_{j,M})$ and the first routing node group as $\Gamma$, where $d_{j,t}$ represents a demand of the $j^{th}$ user for the $t^{th}$ type of resource in the first requirement, $d'_{j,t}$ represents a demand of the $j^{th}$ user for the $t^{th}$ type of resource in the second requirement; judging whether a residual amount of the $t^{th}$ type of resource in a routing node corresponding to the demand of the $j^{th}$ user for the $t^{th}$ type of resource in the first requirement is greater than the demand of the $j^{th}$ user for the $t^{th}$ type of resource in the second requirement; if yes, judging that the resources in the first routing node group meet the second requirement; if no, judging that the resources in the first routing node group do not meet the second requirement.

In some embodiments, the searching module is further configured to: determine routing nodes T with available resources; for each routing node with available resources, judge whether $r_{k,t} > d'_{j,t}, \forall k \in T, 1 \le t \le M$;
if yes, define the routing node with available resources as an available routing node such that available routing nodes are obtained; permit and combine the available routing nodes to obtain the plurality of second routing node groups.

In some embodiments, if there are $n_t$ routing nodes with the $t^{th}$ type of resource meeting the demand $d'_{j,t}$ of the $j^{th}$ user for the $t^{th}$ type of resource in the second requirement, a number of the plurality of second routing node groups is $$n_1 \times n_2 \times \ldots \times n_M.$$

In some embodiments, the calculating module is configured to calculate a plurality of migration overheads corresponding to the plurality of second routing node groups by steps of: defining routing nodes in a second routing node group as $P_i, P_{i+1}, \ldots, P_{i+k}, \ldots P_{i+M}$, where $1 \le i \le N-M$; calculating a migration overhead of the second routing node group according to formula (2), $$S = S_{in} + S_{out} + S_{ch} \qquad (2),$$

where $S_{in}$ represents a sum of internal communication overheads of the routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

In order to achieve the above objectives, embodiments of a third aspect of the present disclosure provides a non-transitory computer-readable storage medium having stored therein instructions that, when executed by a processor of an apparatus, causes the apparatus to perform a programming method for a core routing and switching system according to the first aspect of embodiments of the present disclosure for running an application program.

In order to achieve the above objectives, embodiments of a fourth aspect of the present disclosure provide a programming apparatus for a core routing and switching system, including:

a processor; and a memory for storing instructions executable by the processor, in which the processor is configured to:

obtain a number of routing nodes and a number of resource types in each routing node in the core routing and switching system;

judge whether a first requirement of a user for resources in the routing nodes in the core routing and switching system is changed to a second requirement of the user;

judge whether resources in a first routing node group corresponding to the first requirement meet the second requirement if the first requirement is changed to the second requirement;

search for a plurality of second routing node groups with resources meeting the second requirement in the core routing and switching system if the resources in the first routing node group do not meet the second requirement;

calculate a plurality of migration overheads corresponding to the plurality of second routing node groups;

select a second routing node group corresponding to a smallest migration overhead from the plurality of second routing node groups as a server node for providing a service for a task corresponding to the second requirement.

Additional aspects and advantages of embodiments of present disclosure will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
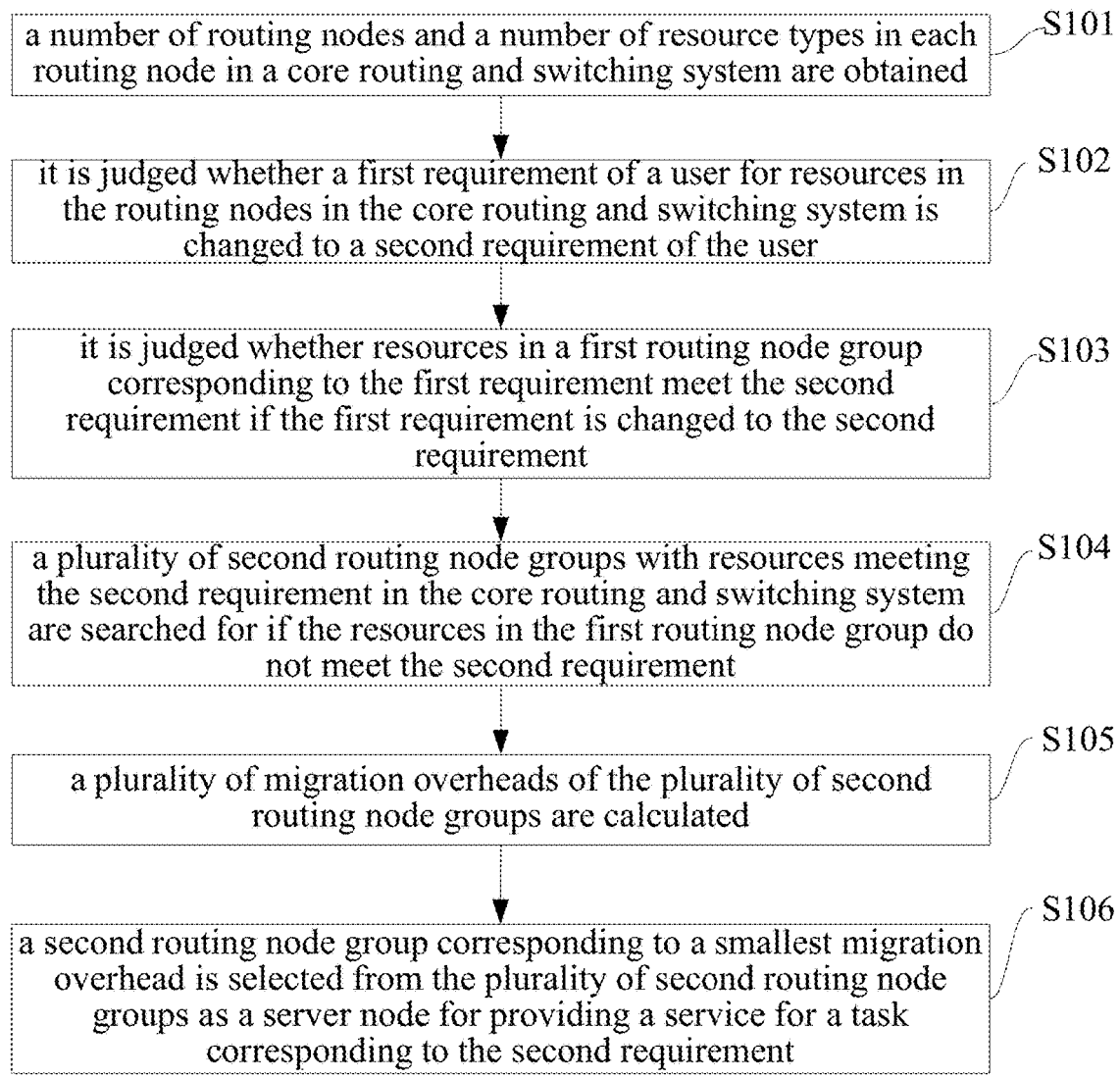
FIG. 1 is a flow chart showing a programming method for a core routing and switching system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the following, a programming method for a core routing and switching system and a programming apparatus for a core routing and switching system according to embodiments of the present disclosure will be described in detail with reference to drawings.

Figure 2:
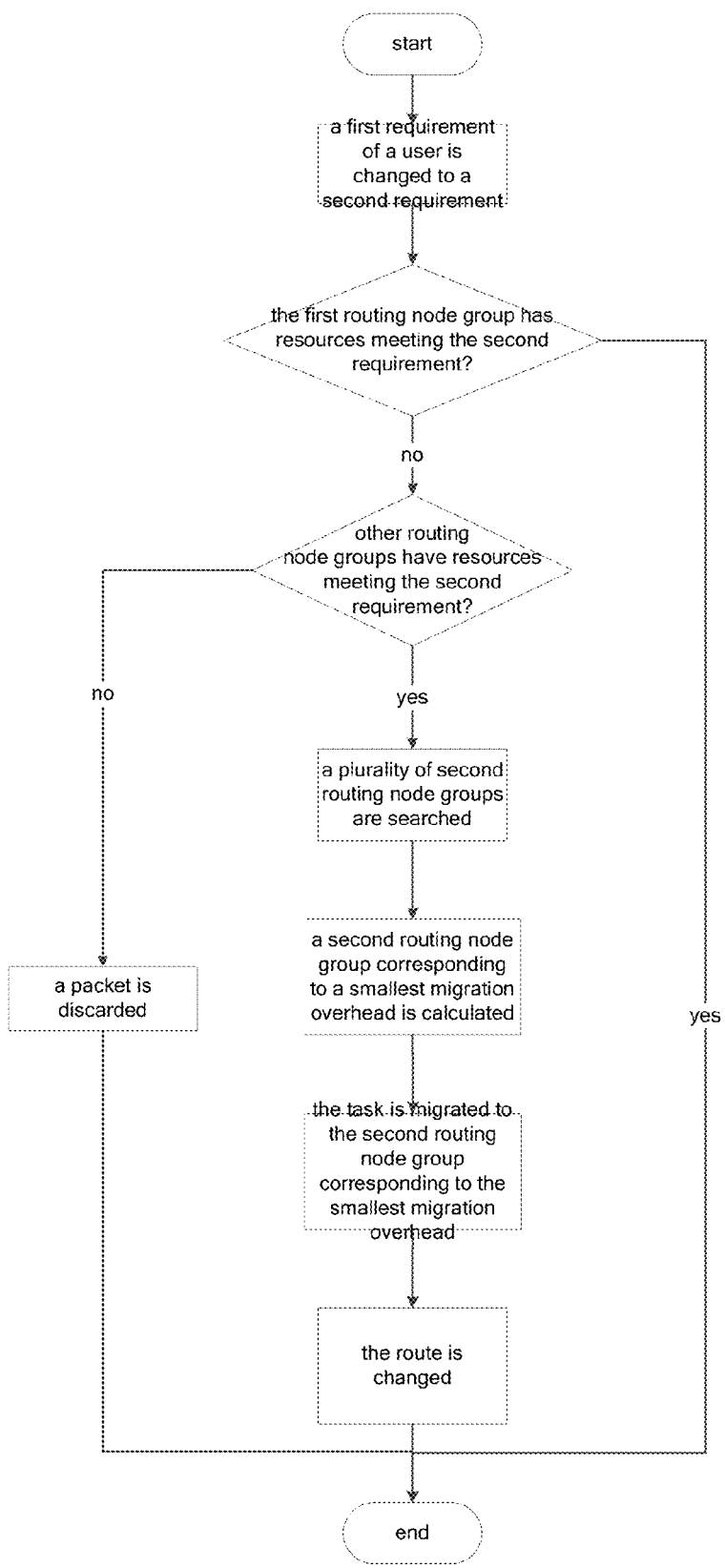
FIG. 2 is a flow chart showing a programming method for a core routing and switching system according to another embodiment of the present disclosure.

FIG. 1 is the flow chart showing a programming method for a core routing and switching system according to an embodiment of the present disclosure. FIG. 2 is the flow chart showing a programming method for a core routing and switching system according to another embodiment of the present disclosure. Referring to FIG. 1 and FIG. 2, the method for a core routing and switching system according to embodiments of the present disclosure includes following steps.

In step S101, a number of routing nodes and a number of resource types in each routing node in the core routing and switching system are obtained.

Referring to FIG. 2, system parameters and a maintain list are determined in this step. Specifically, firstly, the number of the routing nodes in the core routing and switching system is determined, for example, the number of the routing nodes in the core routing and switching system may be denoted as N, and the number of the resource types in each routing node is determined, for example, the number of the resource types in each routing node may be denoted as M, the core routing and switching system maintains a plurality of tuples for the routing nodes in the core routing and switching system, each element of a tuple represents a residual amount of a type of resource in the routing node corresponding to the tuple and the tuple is denoted as formula (1), $$T_{i \in N} = (r_{i,1}, r_{i,2}, \ldots r_{i,t}, \ldots, r_{i,M}) \qquad (1)$$

where i represents a $i^{th}$ routing node, t represents a $t^{th}$ type of resource, $r_{i,t}$ represents a residual amount of the $t^{th}$ type of resource in the $i^{th}$ routing node, $T_{i \in N}$ represents the tuple, and $1 \le t \le M$.

In addition, a communication overhead $P_{i,j}$ between a routing node i and a routing node j is equal to a number of routing hops between these two routing nodes, and an internal communication overhead of each routing node may be negligible. An overhead required to migrate a task from any one of the routing nodes to another routing node may be denoted as $S_{ch}$.

In step S102, it is judged whether a first requirement of a user for resources in the routing nodes in the core routing and switching system is changed to a second requirement of the user.

Specifically, it means that a demand for each resource is changed when the first requirement of the user is changed. It is judged whether the first requirement is changed to the second requirement in this step, if yes, step S103 is executed.

In step S103, it is judged whether resources in a first routing node group corresponding to the first requirement meet the second requirement if the first requirement is changed to the second requirement.

More specifically, the first routing node group is determined firstly, and then the first requirement of a $j^{th}$ user is denoted as $D_j=(d_{j,1}, d_{j,2}, \ldots d_{j,t}, \ldots, d_{j,M})$, the second requirement of the $j^{th}$ user is denoted as $D'_j=(d'_{j,1}, d'_{j,2}, \ldots d'_{j,t}, \ldots, d'_{j,M})$, the first routing node group is located is denoted as $\Gamma$, where $d_{j,t}$ represents a demand of the $j^{th}$ user for a $t^{th}$ type of resource in the first requirement, $d'_{j,t}$ represents a demand of the $j^{th}$ user for the $t^{th}$ type of resource in the second requirement, and then it is judged whether a residual amount of the $t^{th}$ type of resource in a routing node corresponding to the demand $d_{j,t}$ of the $j^{th}$ user for the $t^{th}$ type of resource in the first requirement is greater than the demand $d'_{j,t}$ of the $j^{th}$ user for the $t^{th}$ type of resource in the second requirement, i.e. it is judged whether $r_{i,t} > d'_{j,t}, \forall i \in \Gamma, 1 \leq t \leq M$, if yes, the resources in the first routing node group meet the second requirement, the first routing node group is maintained; if no, the resources in the first routing node group do not meet the second requirement, step S104 is executed.

In step S104, a plurality of second routing node groups with resources meeting the second requirement in the core routing and switching system are searched for if the resources in the first routing node group do not meet the second requirement.

Specifically, a routing node assemble including routing nodes with a type of resource meeting a demand for the type of resource in the second requirement is determined: if the $t^{th}$ type of resource in each routing node in a routing node assemble is greater than the demand for the $t^{th}$ type of resource in the second requirement, it is judged that each routing node in this routing node assemble meets the demand for the $t^{th}$ type of resource in the second requirement (i.e. each routing node in this routing node assemble may be one of the second routing node group and corresponds to the demand for the $t^{th}$ type of resource in the second requirement). And then the second routing node group including routing nodes with resources respectively meeting demands for all types of resources in the second requirement may be determined.

In some embodiments, if there are $n_t$ routing nodes with the $t^{th}$ type of resource meeting the demand $d'_{j,t}$ of the $j^{th}$ user for the $t^{th}$ type of resource in the second requirement, a number of the plurality of second routing node groups in the core routing and switching system is $n_1 \times n_2 \times \ldots \times n_M$, and the plurality of second routing node groups may be denoted as $[\Pi_1, \Pi_2, \ldots, \Pi_t, \ldots, \Pi_M], \forall \Pi_t \neq \emptyset$.

However, if no routing node group with resources meeting the second requirement is found, a packet corresponding to the second requirement is discarded and a message indicating the packet is unsuccessfully handled is sent to the user.

In step S105, a plurality of migration overheads corresponding to the plurality of second routing node groups are calculated.

Specifically, routing nodes in a second routing node group are denoted as $P_i, P_{i+1}, \ldots, P_{i+k}, \ldots P_{i+M}$, where $1 \leq i \leq N-M$; a migration overhead of the second routing node group is calculated according to formula (2), $$S = S_{in} + S_{out} + S_{ch} \qquad (2),$$

where $S_{in}$ represents a sum of internal communication overheads of routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

In step S106, a second routing node group corresponding to a smallest migration overhead is selected from the plurality of second routing node groups as a server node for providing a service for a task corresponding to the second requirement.

Specifically, the second routing node group corresponding to the smallest migration overhead is selected from the plurality of second routing node groups as the server node for providing the service for the task corresponding to the second requirement. When the task arrivals, the second routing node group corresponding to the smallest migration overhead provides service for the task, thus a service time may be reduced and the second requirement (i.e. the new requirement) of the user may be responded rapidly.

Figure 3:
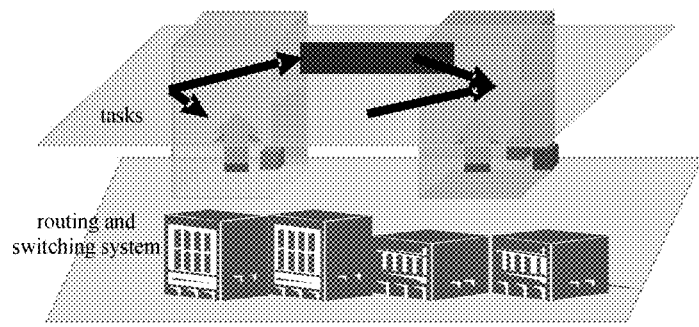
FIG. 3 is a schematic diagram illustrating a work environment for implementing a programming method for a core routing and switching system according to an embodiment of the present disclosure.

In some examples, the programming method for a core routing and switching system according to embodiments of the present disclosure is applied in a reconfigurable routing and switching system. If an original task of the user changes such that a demand for resources changes, routing nodes for providing a service for the task may be switched dynamically in real-time, thus reducing the delay time and accelerating the response speed. A work environment for implementing this programming method for a core routing and switching system may be shown in FIG. 3.

Figure 4:
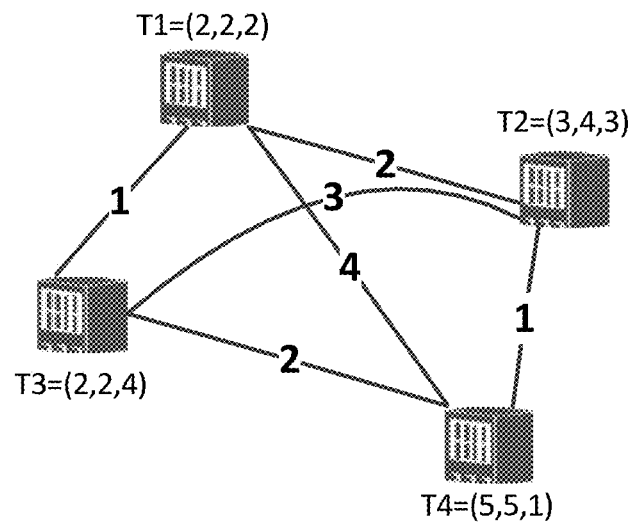
FIG. 4 is a schematic diagram illustrating a communication overhead between each two routing nodes according to an embodiment of the present disclosure.

For example, as shown in FIG. 4, assuming that there are 4 routing nodes in the core routing and switching system, that each routing node includes 3 kinds of resources: CPU resources, Memory resources and Link resources, that each tuple corresponding to each routing node may be denoted as $T_1=(2,2,2)$, $T_2=(3,4,3)$, $T_3=(2,2,4)$ and $T_4=(5,5,1)$ and that an overhead of switching between the routing nodes may be denoted as w=1, the number of hops between each two routing nodes (i.e. the communication overhead between the each two routing nodes) may be shown in FIG. 4.

Assuming that the first requirement of the user is denoted as D=(2,3,4) and corresponds to routing nodes 1, 2, 3, and that the first requirement is changed to the second requirement which is denoted as D'=(5,3,4), resources in the first routing node group (i.e. routing nodes 1, 2, 3) are checked, and a conclusion that the residual amount of the CPU resource in routing node 1 is 2, which cannot meet the demand for the CPU resource (5) in the second requirement is obtained. And then a routing node assemble including routing nodes with a type of resource meeting a demand for the type of resource in the second requirement is searched in the core routing and switching system, for example, $\Pi_1=\{4\}$ may be obtained, in other words, the CPU resource in routing mode 4 may meet the demand for the CPU resource in the second requirement, in view of the same reason $\Pi_2=\{2,4\}$ and $\Pi_3=\{3\}$ may be obtained. So the number of the plurality of second routing node groups with resources meeting the second requirement may be 1×2×1=2, i.e. the plurality of second routing node groups include: {routingnode4,routingnode2,routingnode3} and {routingnode4,routingnode4,routingnode3}.

Further, the migration overhead of the second routing node group {routingnode4, routingnode2, routingnode3} is calculated, in which $S_{out}=1+3=4$, $S_{ch}=1$ because that only one migration occurs (routing node 1 is switched to routing node 4), so the migration overhead of the second routing node group {routingnode4,routingnode2,routingnode3} may be 4+1=5.

Similarly, the migration overhead of the second routing node group {routingnode4, routingnode4, routingnode3} is calculated, in which $S_{out}=2$, $S_{ch}=2$ because that two migrations occur (routing nodes 1 and 2 are switched to routing node 4 respectively), so the migration overhead of the second routing node group {routingnode4, routingnode4, routingnode3} may be 2+2=4<5, so the second routing node group {routingnode4,routingnode4,routingnode3} may be defined as the server node for providing the service for the task. Therefore, the route is reconfigured to be routing node 4-routing node 3.

In summary, with the programming method for a core routing and switching system according to embodiments of the present disclosure, difficulties in the core routing and switching system may be considered fully, and routing nodes meeting a requirement of the user may be found in the core routing and switching system quickly, and by calculating communication overheads between the routing nodes and switching overheads of switching routing nodes, a solution corresponding to the smallest migration overhead may be obtained. Therefore, a response speed of the core routing and switching system may be improved, a user experience may be optimized, and a smooth running of the core routing and switching system may be ensured.

With the programming method for a core routing and switching system according to embodiments of the present disclosure, when the first requirement of the user is changed to the second requirement in the core routing and switching system, if resources in the first routing node group corresponding to the first requirement cannot meet the second requirement of the user, firstly, it is judged whether other routing nodes in the core routing and switching system have enough resources meeting the second requirement, and if there are other routing nodes with resources meeting the second requirement, the plurality of second routing node groups (i.e. groups including routing nodes in which resources meet the second requirement) are determined, and then a second routing node group corresponding to a smallest migration overhead may be selected from the plurality of second routing node groups, and then the route is changed. This programming method may improve a response speed of the core routing and switching system, optimize a user experience and support reconfiguration of a route when the core routing and switching system is running.

A programming apparatus for a core routing and switching system according to embodiments of the present disclosure is provided.

Figure 5:
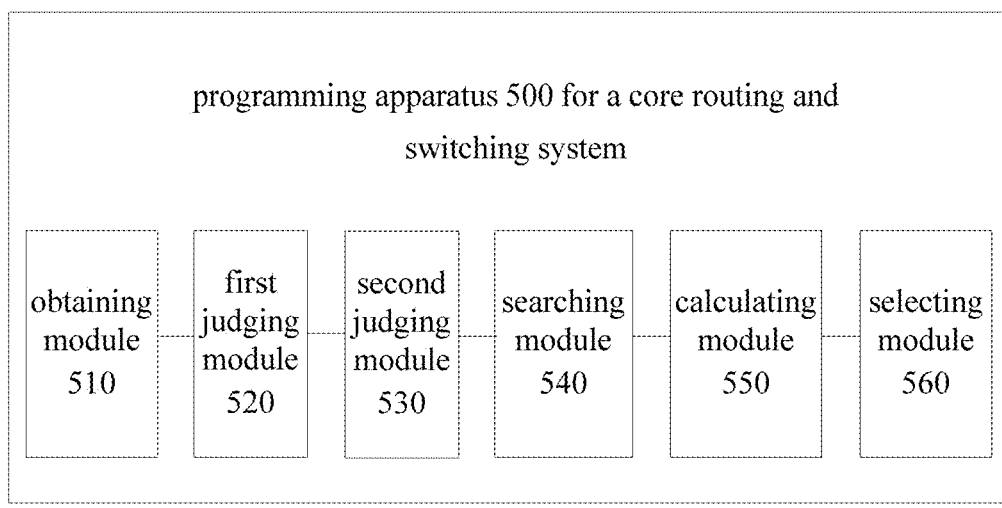
FIG. 5 is a block diagram illustrating a programming apparatus for a core routing and switching system according to an embodiment of the present disclosure.

FIG. 5 is the block diagram illustrating a programming apparatus for a core routing and switching system according to an embodiment of the present disclosure. As shown in FIG. 5, the programming apparatus 500 includes an obtaining module 510, a first judging module 520, a second judging module 530, a searching module 540, a calculating module 550 and a selecting module 560.

Specifically, the obtaining module 510 is configured to obtain a number of routing nodes and a number of resource types in each routing node in the core routing and switching system. In other words, system parameters and a maintain list are determined by the obtaining module 510. Specifically, firstly, the number of the routing nodes in the core routing and switching system is determined, for example, the number of the routing nodes in the core routing and switching system may be denoted as N, and the number of the resource types in each routing node is determined, for example, the number of the resource types in each routing node may be denoted as M, the core routing and switching system maintains a plurality of tuples for the routing nodes in the core routing and switching system, each element of a tuple represents a residual amount of a type of resource in the routing node corresponding to the tuple and the tuple is denoted as formula (1), $$T_{i \in N} = (r_{i,1}, r_{i,2}, \ldots r_{i,t}, \ldots, r_{i,M}) \quad (1)$$

where i represents a $i^{th}$ routing node, t represents a $t^{th}$ type of resource, $r_{i,t}$ represents a residual amount of the $t^{th}$ type of resource in the $i^{th}$ routing node, $T_{i \in N}$ represents the tuple, and $1 \le t \le M$.

In addition, a communication overhead $P_{i,j}$ between a routing node i and a routing node j is equal to a number of routing hops between these two routing nodes, and an internal communication overhead of each routing node may be negligible. An overhead required to migrate a task from any one of the routing nodes to another routing node may be denoted as $S_{ch}$.

The first judging module 520 is configured to judge whether a first requirement of a user for resources in the routing nodes in the core routing and switching system is changed to a second requirement of the user.

Specifically, it means that a demand for each resource is changed when the first requirement of the user is changed. It is judged whether the first requirement is changed to the second requirement in this step.

The second judging module 530 is configured to judge whether resources in a first routing node group corresponding to the first requirement meet the second requirement if the first requirement is changed to the second requirement.

More specifically, the first routing node group is determined firstly, and then the first requirement of a $j^{th}$ user is denoted as $D_j=(d_{j,1}, d_{j,2}, \ldots d_{j,t}, \ldots, d_{j,M})$, the second requirement of the $j^{th}$ user is denoted as $D'_j=(d'_{j,1}, d'_{j,2}, \ldots d'_{j,t}, \ldots, d'_{j,M})$, the first routing node group is located is denoted as $\Gamma$, where $d_{j,t}$ represents a demand of the $j^{th}$ user for a $t^{th}$ type of resource in the first requirement, $d'_{j,t}$ represents a demand of the $j^{th}$ user for the $t^{th}$ type of resource in the second requirement, and then it is judged whether a residual amount of the $t^{th}$ type of resource in a routing node corresponding to the demand $d_{j,t}$ of the $j^{th}$ user for the $t^{th}$ type of resource in the first requirement is greater than the demand $d'_{j,t}$ of the $j^{th}$ user for the $t^{th}$ type of resource in the second requirement, i.e. it is judged whether $r_{i,t} > d'_{j,t}$ $\forall i \in \Gamma, 1 \le t \le M$, if yes, the resources in the first routing node group meet the second requirement, the first routing node group is maintained; if no, the resources in the first routing node group do not meet the second requirement.

The searching module 540 is configured to search for a plurality of second routing node groups with resources meeting the second requirement in the core routing and switching system if the resources in the first routing node group do not meet the second requirement.

Specifically, a routing node assemble including routing nodes with a type of resource meeting a demand for the type of resource in the second requirement is determined: if the $t^{th}$ type of resource in each routing node in a routing node assemble is greater than the demand for the $t^{th}$ type of resource in the second requirement, it is judged that each routing node in this routing node assemble meets the demand for the $t^{th}$ type of resource in the second requirement (i.e. each routing node in this routing node assemble may be one of the second routing node group and corresponds to the demand for the $t^{th}$ type of resource in the second requirement). And then the second routing node group including routing nodes with resources respectively meeting demands for all types of resources in the second requirement may be determined.

In some embodiments, if there are $n_t$ routing nodes with the $t^{th}$ type of resource meeting the demand $d'_{j,t}$ of the $j^{th}$ user for the $t^{th}$ type of resource in the second requirement, a number of the plurality of second routing node groups in the core routing and switching system is $n_1 \times n_2 \times \ldots \times n_M$, and the plurality of second routing node groups may be denoted as $[\Pi_1, \Pi_2, \ldots, \Pi_i, \ldots, \Pi_M], \forall \Pi_i \neq \emptyset$, The calculating module 550 is configured to calculate a plurality of migration overheads corresponding to the plurality of second routing node groups.

Specifically, routing nodes in a second routing node group are denoted as $P_i, P_{i+1}, \ldots, P_{i+k}, \ldots P_{i+M}$, where $1 \leq i \leq N-M$; a migration overhead of the second routing node group is calculated according to formula (2), $$S = S_{in} + S_{out} + S_{ch} \qquad (2),$$

where $S_{in}$ represents a sum of internal communication overheads of routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

The selecting module 560 is configured to select a second routing node group corresponding to a smallest migration overhead from the plurality of second routing node groups as a server node for providing a service for a task corresponding to the second requirement.

Specifically, the second routing node group corresponding to the smallest migration overhead is selected from the plurality of second routing node groups as a server node for providing the service for the task corresponding to the second requirement. When the task arrivals, the second routing node group corresponding to the smallest migration overhead provides service for the task, thus a service time may be reduced and the second requirement (i.e. the new requirement) of the user may be responded rapidly.

Concerning the detailed description of a specific example of the programming apparatus 500, reference is made to embodiments corresponding to the programming method for a core routing and switching system, which are not elaborated herein again.

With the programming apparatus for a core routing and switching system according to embodiments of the present disclosure, when the first requirement of the user is changed to the second requirement in the core routing and switching system, if resources in the first routing node group corresponding to the first requirement cannot meet the second requirement of the user, firstly, it is judged whether other routing nodes in the core routing and switching system have enough resources meeting the second requirement, and if there are other routing nodes with resources meeting the second requirement, the plurality of second routing node groups (i.e. groups including routing nodes in which resources meet the second requirement) are determined, and then a second routing node group corresponding to a smallest migration overhead may be selected from the plurality of second routing node groups, and then the route is changed. This programming apparatus may improve a response speed of the core routing and switching system, optimize a user experience and support a reconfiguration of a route when the core routing and switching system is running.

In the following, a non-transitory computer-readable storage medium according to embodiments of the present disclosure will be described in detail.

In some embodiments, the non-transitory computer-readable storage medium having stored therein instructions that, when executed by a processor of a terminal, causes the terminal to perform a programming method for a core routing and switching system for running an application program, in which the programming method for a core routing and switching system is according to the above embodiments of the present disclosure.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A programming method for a core routing and switching system, comprising:

obtaining a number of routing nodes and a number of resource types in each routing node in the core routing and switching system;

judging whether a first requirement of a user for resources in the routing nodes in the core routing and switching system is changed to a second requirement of the user;

judging whether resources in a first routing node group corresponding to the first requirement meet the second requirement if the first requirement is changed to the second requirement;

searching for a plurality of second routing node groups with resources meeting the second requirement in the core routing and switching system if the resources in the first routing node group do not meet the second requirement;

calculating a plurality of migration overheads corresponding to the plurality of second routing node groups;

selecting a second routing node group corresponding to a smallest migration overhead from the plurality of second routing node groups as a server node for providing a service for a task corresponding to the second requirement;

wherein obtaining a number of routing nodes and a number of resource types in each routing node in the core routing and switching system comprises:

maintaining by the core routing and switching system a plurality of tuples for the routing nodes in the core routing and switching system, wherein each element in a tuple represents a residual amount of a type of resource in a routing node corresponding to the tuple and the tuple is denoted as formula (1), $$T_{i \in N} = (r_{i,1}, r_{i,2}, \ldots r_{i,t}, \ldots, r_{i,M}) \quad (1)$$

where i represents a $i^{th}$ routing node, t represents a $t^{th}$ type of resource, N represents the number of the routing nodes in the core routing and switching system, M represents the number of the resource types, $r_{i,t}$ represents a residual amount of the $t^{th}$ type of resource in the $i^{th}$ routing node, $T_{i \in N}$ represents the tuple, and $1 \leq t \leq M$.

2. The programming method according to claim 1, wherein judging whether resources in a first routing node group corresponding to the first requirement meet the second requirement comprises:

determining the first routing node group corresponding to the first requirement;

defining the first requirement of a $j^{th}$ user as $D_j=(d_{j,1}, d_{j,2}, \ldots d_{j,t}, \ldots, d_{j,M})$, the second requirement of the $j^{th}$ user as $D_j'=(d_{j,1}', d_{j,2}', \ldots d_{j,t}', \ldots, d_{j,M}')$ and the first routing node group as $\Gamma$, where $d_{j,t}$ represents a demand of the $j^{th}$ user for the $t^{th}$ type of resource in the first requirement, $d_{j,t}'$ represents a demand of the $j^{th}$ user for the $t^{th}$ type of resource in the second requirement;

judging whether a residual amount of the $t^{th}$ type of resource in a routing node corresponding to the demand $d_{j,t}$ of the $j^{th}$ user for the $t^{th}$ type of resource in the first requirement is greater than the demand $d_{j,t}'$ of the $j^{th}$ user for the $t^{th}$ type of resource in the second requirement;

if yes, judging that the resources in the first routing node group meet the second requirement;

if no, judging that the resources in the first routing node group do not meet the second requirement.

3. The programming method according to claim 2, wherein if there are n, routing nodes with the $t^{th}$ type of resource meeting the demand $d_{j,t}'$ of the $j^{th}$ user for the $t^{th}$ type of resource in the second requirement, a number of the plurality of second routing node groups is $$n_1 \times n_2 \times \ldots \times n_M.$$

4. The programming method according to claim 2, wherein calculating a plurality of migration overheads corresponding to the plurality of second routing node groups comprises:

defining routing nodes in a second routing node group as $P_i, P_{i+1}, \ldots, P_{i+k}, \ldots P_{i+M}$, where $1 \leq i \leq N-M$;

calculating a migration overhead of the second routing node group according to formula (2), $$S=S_{in}+S_{out}+S_{ch} \quad (2),$$

where $S_{in}$ represents a sum of internal communication overheads of the routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

5. A programming apparatus for a core routing and switching system, comprising:
an obtaining module, configured to obtain a number of routing nodes and a number of resource types in each routing node in the core routing and switching system;
a first judging module, configured to judge whether a first requirement of a user for resources in the routing nodes in the core routing and switching system is changed to a second requirement of the user;
a second judging module, configured to judge whether resources in a first routing node group corresponding to the first requirement meet the second requirement if the first requirement is changed to the second requirement;
a searching module, configured to search for a plurality of second routing node groups with resources meeting the second requirement in the core routing and switching system if the resources in the first routing node group do not meet the second requirement;
a calculating module, configured to calculate a plurality of migration overheads corresponding to the plurality of second routing node groups;
a selecting module, configured to select a second routing node group corresponding to a smallest migration overhead from the plurality of second routing node groups as a server node for providing a service for a task corresponding to the second requirement;
wherein the obtaining module is further configured to obtain a number of routing nodes and a number of resource types of each routing node in the core routing and switching system by a step of:
maintaining a plurality of tuples for the routing nodes in the core routing and switching system, wherein each element in a tuple represents a residual amount of a type of resource in a routing node corresponding to the tuple and the tuple is denoted as formula (1), $$T_{i \in N}=(r_{i,1}, r_{i,2}, \ldots r_{i,t} \ldots, r_{i,M}) \quad (1)$$

where i represents a $i^{th}$ routing node, t represents a $t^{th}$ type of resource, N represents the number of the routing nodes, M represents the number of the resource types, $r_{i,t}$ represents a residual amount of the $t^{th}$ type of resource in the $i^{th}$ routing node, $T_{i \in N}$ represents the tuple, and $1 \le t \le M$.

6. The programming apparatus according to claim 5, wherein the second judging module is configured to judge whether resources in a first routing node group corresponding to the first requirement meet the second requirement by steps of:
determining the first routing node group corresponding to the first requirement;
defining the first requirement of a $j^{th}$ user as $D_j=(d_{j,1}, d_{j,2}, \ldots d_{j,t}, \ldots, d_{j,M})$, the second requirement of the $j^{th}$ user as $D_j'=(d_{j,1}', d_{j,2}', \ldots d_{j,t}', \ldots, d_{j,M}')$ and the first routing node group as $\Gamma$, where $d_{j,t}$ represents a demand of the $j^{th}$ user for the $t^{th}$ type of resource in the first requirement, $d_{j,t}'$ represents a demand of the $j^{th}$ user for the type of $t^{th}$ resource in the second requirement;
judging whether a residual amount of the $t^{th}$ type of resource in a routing node corresponding to the demand $d_{j,t}$ of the $j^{th}$ user for the $t^{th}$ type of resource in the first requirement is greater than the demand $d_{j,t}'$ of the j user for the $t^{th}$ type of resource in the second requirement;
if yes, judging that the resources in the first routing node group meet the second requirement;
if no, judging that the resources in the first routing node group do not meet the second requirement.

7. The programming apparatus according to claim 6, wherein if there are $n_t$ routing nodes with the $t^{th}$ type of resource meeting the demand $d_{j,t}'$ of the $j^{th}$ user for the $t^{th}$ type of resource in the second requirement, a number of the plurality of second routing node groups is $$n_1 \times n_2 \times \ldots \times n_M.$$

8. The programming apparatus according to claim 6, wherein the calculating module is configured to calculate a plurality of migration overheads corresponding to the plurality of second routing node groups by steps of:
defining routing nodes in a second routing node group as $P_i, P_{i+1}, \ldots, P_{i+k}, \ldots, P_{i+M}$, where $1 \le i \le N-M$;
calculating a migration overhead of the second routing node group according to formula (2), $$S=S_{in}+S_{out}+S_{ch} \quad (2),$$

where $S_{in}$ represents a sum of internal communication overheads of the routing nodes in the second routing node group, $S_{out}$ represents a sum of communication overheads between the routing nodes in the second routing node group, and $S_{ch}$ represents a sum of migration overheads of switching from routing nodes in the first routing node group respectively to the routing nodes in the second routing node group.

9. A non-transitory computer-readable storage medium having stored therein instructions that, when executed by a processor of an apparatus, causes the apparatus to perform a programming method for a core routing and switching system, wherein the method comprises steps of:
obtaining a number of routing nodes and a number of resource types in each routing node in the core routing and switching system;
judging whether a first requirement of a user for resources in routing nodes in the core routing and switching system is changed to a second requirement of the user;
judging whether resources in a first routing node group corresponding to the first requirement meet the second requirement if the first requirement is changed to the second requirement;
searching for a plurality of second routing node groups with resources meeting the second requirement in the core routing and switching system if the resources in the first routing node group do not meet the second requirement;
calculating a plurality of migration overheads corresponding to the plurality of second routing node groups;
selecting a second routing node group corresponding to a smallest migration overhead from the plurality of second routing node groups as a server node for providing a service for a task corresponding to the second requirement;
wherein obtaining a number of routing nodes and a number of resource types in each routing node in the core routing and switching system comprises:

maintaining by the core routing and switching system a plurality of tuples for the routing nodes in the core routing and switching system, wherein each element in a tuple represents a residual amount of a type of resource in a routing node corresponding to the tuple and the tuple is denoted as formula (1), $$T_{i \in N} = (r_{i,1}, r_{i,2}, \ldots r_{i,t} \ldots, r_{i,M}) \tag{1}$$

where i represents a $i^{th}$ routing node, t represents a $t^{th}$ type of resource, N represents the number of the routing nodes in the core routing and switching system, M represents the number of the resource types, $r_{i,t}$ represents a residual amount of the $t^{th}$ type of resource in the $i^{th}$ routing node, $T_{i \in N}$ represents the tuple, and $1 \leq t \leq M$.

* * * * *